United States Patent
Zhang

(10) Patent No.: US 10,828,784 B2
(45) Date of Patent: Nov. 10, 2020

(54) METHOD AND APPARATUS FOR CONTROLLING DANCING OF SERVICE ROBOT

(71) Applicant: Goertek Inc., Weifang, Shandong Province (CN)

(72) Inventor: Liang Zhang, Weifang (CN)

(73) Assignee: Goertek Inc., Weifang (CN)

( * ) Notice: Subject to any disclaimer, the term of this patent is extended or adjusted under 35 U.S.C. 154(b) by 0 days.

(21) Appl. No.: 16/301,055

(22) PCT Filed: Jun. 16, 2017

(86) PCT No.: PCT/CN2017/088725
§ 371 (c)(1),
(2) Date: Nov. 13, 2018

(87) PCT Pub. No.: WO2018/010521
PCT Pub. Date: Jan. 18, 2018

(65) Prior Publication Data
US 2019/0184575 A1 Jun. 20, 2019

(30) Foreign Application Priority Data
Jul. 14, 2016 (CN) .......................... 2016 1 0555450

(51) Int. Cl.
*G06F 17/00* (2019.01)
*B25J 11/00* (2006.01)
*B25J 9/16* (2006.01)

(52) U.S. Cl.
CPC ......... *B25J 11/0035* (2013.01); *B25J 9/1664* (2013.01); *B25J 11/008* (2013.01)

(58) Field of Classification Search
CPC ...... B25J 11/0035; B25J 9/1664; B25J 11/008
(Continued)

(56) References Cited

U.S. PATENT DOCUMENTS 6,199,034 B1 * 3/2001 Wical ................... G06F 17/2785
704/9
9,067,132 B1 * 6/2015 Bergeron ................ A63F 13/00
(Continued)

FOREIGN PATENT DOCUMENTS

CN 1683122 A 10/2005
CN 101411948 A 4/2009
(Continued)

*Primary Examiner* — Ronnie M Mancho
(74) *Attorney, Agent, or Firm* — LKGlobal | Lorenz & Kopf, LLP

(57) ABSTRACT

A method and apparatus for controlling dancing of a service robot are provided. The method comprises: providing corresponding part controlling commands for preset actions of individual parts of the service robot, and providing a dance controlling strategy indicating times for sending a command and a command sending interval of the part controlling commands; when receiving a dance starting command, establishing a wireless connection with an external speaker located outside the service robot, loading a song from a song library of the service robot, and determining that the song currently loaded by the service robot is the song to be played by the external speaker; according to the loaded song, selecting a dance controlling strategy used by the service robot, and determining a command sending timing of the part controlling command of the dance controlling strategy; and when the external speaker is playing the song and the command sending timing of the dance controlling strategy arrives, sending a randomly selected part controlling command to the corresponding part of the service robot till the times for sending a command of the dance controlling strategy is reached, and controlling the service robot to dance to the song.

16 Claims, 5 Drawing Sheets

(58) Field of Classification Search
USPC .......................................................... 700/245
See application file for complete search history.

(56) References Cited

U.S. PATENT DOCUMENTS

| | | |
|---|---|---|
| 2003/0069669 A1 | 4/2003 | Yamaura |
| 2008/0078282 A1 | 4/2008 | Saijo |
| 2009/0104841 A1 | 4/2009 | Yen |
| 2012/0142429 A1* | 6/2012 | Muller ................... A63F 13/45 463/42 |
| 2013/0073387 A1* | 3/2013 | Heath .................... G06Q 50/01 705/14.53 |
| 2018/0025664 A1* | 1/2018 | Clarke ................. G09B 19/003 434/257 |

FOREIGN PATENT DOCUMENTS

| | | |
|---|---|---|
| CN | 101524594 A | 9/2009 |
| CN | 101693371 A | 4/2010 |
| CN | 105701196 A | 6/2016 |
| CN | 106217384 A | 12/2016 |

\* cited by examiner

METHOD AND APPARATUS FOR CONTROLLING DANCING OF SERVICE ROBOT

CROSS REFERENCE TO RELATED APPLICATIONS

This application is a U.S. National Stage entry under 35 U.S.C. § 371 based on International Application No. PCT/CN2017/088725, filed on Jun. 16, 2017, which was published under PCT Article 21(2) and which claims priority to Chinese Patent Application No. 201610555450.6, filed on Jul. 14, 2016. The embodiment of the priority applications are hereby incorporated herein in their entirety by reference.

TECHNICAL FIELD

The present disclosure relates to the technical field of service robots, and more specifically to a method and apparatus for controlling dancing of a service robot.

BACKGROUND

With the development of smart robot technology, home service robots have gradually entered the market. Service robots, such as companion robots and entertainment robots, can provide services such as storytelling, singing and dancing.

Researches on music entertainment robots are still rare so far. Some music entertainment robots that can move with music are occasionally seen in the market. In these robots, the actions to be performed by the robot are provided in advance with respect to a specific song. The robot plays the music by itself and performs the preset actions at the same time of playing the music.

Since these music entertainment robots play music by themselves, the users (such as children) will easily feel the difference between the robots and human being, and thus they have a poor anthropomorphic effect and cannot be well adapted to the home environment. Moreover, the robot performs the same actions with respect to a specific song, so after using several times, the user will feel boring, thus the user experience is poor.

SUMMARY

In view of the situation as stated above, the present disclosure provides a method and apparatus for controlling dancing of a service robot to solve the problem of the conventional music entertainment robots that the user experience is poor due to the limitation of the preset actions.

To achieve the above object, the technical solutions of the present disclosure are as follows:

In one aspect, the present disclosure provides a method for controlling dancing of a service robot, comprising:

providing corresponding part controlling commands for preset actions of individual parts of the service robot, and providing a dance controlling strategy indicating times for sending a command and a command sending interval of the part controlling commands;

wherein the method further comprises:

when receiving a dance starting command, establishing a wireless connection with an external speaker located outside the service robot, loading a song from a song library of the service robot, and determining that the song currently loaded by the service robot is the song to be played by the external speaker;

according to the song, selecting a dance controlling strategy used by the service robot, and determining a command sending timing of the part controlling commands of the dance controlling strategy; and when the external speaker is playing the song and the command sending timing of the dance controlling strategy arrives, sending a randomly selected part controlling command to the corresponding part of the service robot till the times for sending a command of the dance controlling strategy is reached, and controlling the service robot to dance to the song.

In another aspect, the present disclosure further provides an apparatus for controlling dancing of a service robot, comprising:

a storing unit is for, storing corresponding part controlling commands which are provided for preset actions of individual parts of the service robot, and storing a dance controlling strategy indicating times for sending a command and a command sending interval of the part controlling commands;

a connecting unit is for, when receiving a dance starting command, establishing a wireless connection with an external speaker located outside the service robot;

a loading unit is for, when receiving a dance starting command, loading a song from a song library of the service robot, and determining that the song currently loaded by the service robot is the song to be played by the external speaker;

a selecting unit is for, according to the song, selecting a dance controlling strategy used by the service robot from the storing unit, and determining a command sending timing of the part controlling commands of the dance controlling strategy; and a controlling unit is for, when the external speaker is playing the song and the command sending timing of the dance controlling strategy arrives, sending a randomly selected part controlling command to the corresponding part of the service robot till the times for sending a command of the dance controlling strategy is reached, and controlling the service robot to dance to the song.

The advantageous effects of the technical solutions of the present disclosure are as follows. According to the present disclosure, the time point and the times for sending a command of randomly sending a command to the corresponding part of the service robot is controlled on the basis of providing the part controlling commands and the dance controlling strategy, so that the service robot dances to the song, and thus a relatively complete dance control solution of the service robot is obtained. Since the service robot of the present embodiment can cooperate with the external speaker and dance to the music played by the speaker, which simulates the dancing of human being fairly well, facilitates the user to have sympathetic response, ensures the effect of the music, enhances the atmosphere of the dancing, and is suitable for situations such as home living. Moreover, according to the present disclosure, the service robot can make different dance gestures following the songs according to the loaded songs, and the dance gestures made by the service robot for the same song are not the same, which greatly enriches the dance movements of the service robot and improves the user experience.

BRIEF DESCRIPTION OF DRAWINGS

The drawings are used to provide a further understanding of the present disclosure and constitute a part of the specification. The drawings are intended to explain the present disclosure together with the following embodiments of the present disclosure and are not to be construed as limiting the present disclosure. In the drawings.

DETAILED DESCRIPTION

In order to make the objectives, technical solutions and advantages of the present disclosure clearer, the embodiments of the present disclosure will be further described in detail below with reference to the accompanying drawings.

Figure 1:
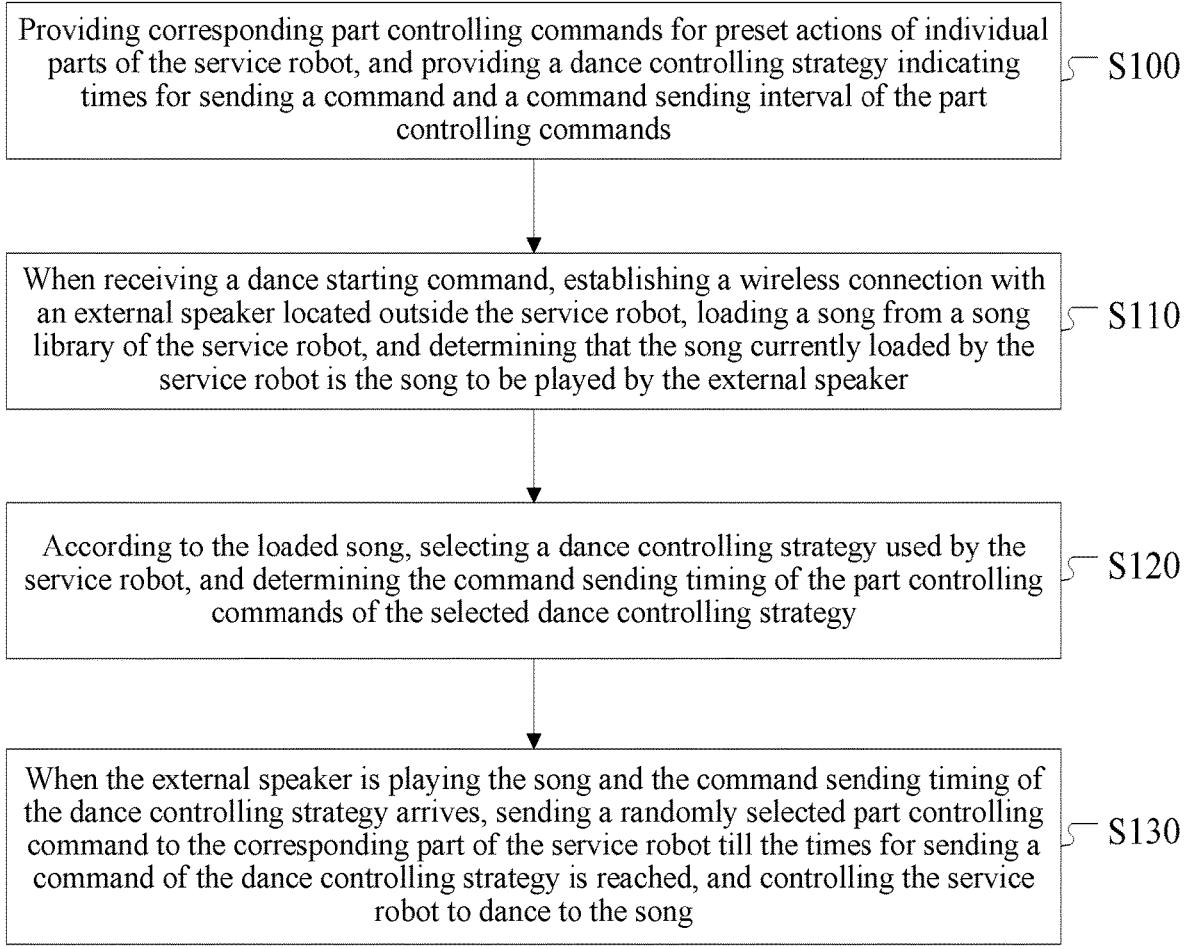
FIG. 1 is a flowchart of a method for controlling dancing of a service robot according to an embodiment of the present disclosure.

FIG. 1 is a flowchart of a method for controlling dancing of a service robot according to the present embodiment. As shown in FIG. 1, the method comprises the following steps:

S100, providing corresponding part controlling commands for preset actions of individual parts of the service robot, and providing a dance controlling strategy indicating times for sending a command and a command sending interval of the part controlling commands.

In order to increase the variety of dance gestures, in the present embodiment, before controlling the dancing of the service robot, corresponding part controlling commands for preset actions of individual movable parts of the service robot, such as the head, the body, the arms and the legs, are provided in advance. Taking the head turning of the service robot as an example, corresponding head controlling commands may be provided for the horizontal head turning and the vertical head turning of the service robot individually, and each of the head controlling commands indicates a turning range of the head. For example, the head may be turned at a fixed angle, or turned at a random angle.

The command sending intervals or the command sending time quantities of any two dance controlling strategies are different, or both of the command sending intervals and the command sending time quantities are different. Preferably, the providing the dance controlling strategy in step S100 is specifically: setting the times for sending a command of the dance controlling strategy to be a fixed value, or setting the times for sending a command of the dance controlling strategy to be a random value.

In the present disclosure, the time taken by one beat, that is, the duration of one beat, should be understood as the average playback time taken by each beat of the song. If a song has a total of 120 beats and the playback time is 1 minute, the tempo of the song is 60/120=0.5 second/beat, the duration of one beat is 0.5 seconds, and the duration of two beats is 1 second. Thereby the command sending interval of the dance controlling strategy is obtained.

S110, when receiving a dance starting command, establishing a wireless connection with an external speaker located outside the service robot, loading a song from a song library of the service robot, and determining that the song currently loaded by the service robot is the song to be played by the external speaker.

In the present embodiment, various types of songs and dances can be loaded from the song library of the service robot, and the file format of the loaded song is not limited. Of course, in practical applications, when a dance starting command is received, the currently loaded song may also be played by directly using the speaker of the service robot itself.

Considering the performance limitation of the speaker of the service robot itself, its playing effect is worse than that of the external speaker, so in the present embodiment, preferably, the external speaker is selected to play the loaded song. Any external speaker that satisfies the relevant communication protocols can establish a connection with the service robot to play the song loaded by the service robot.

S120, according to the loaded song, selecting a dance controlling strategy used by the service robot, and determining the command sending timing of the part controlling commands of the selected dance controlling strategy.

In a specific implementation, the method may obtain a tempo of the loaded song, and according to the tempo of the song, select a dance controlling strategy used by the service robot. The embodiment of selecting a dance controlling strategy used by the service robot according to the tempo of the song will be specifically described later. Of course, the method may also store a corresponding relation between a song and a dance controlling strategy, and select a dance controlling strategy used by the service robot according to the corresponding relation.

S130, when the external speaker is playing the song and the command sending timing of the dance controlling strategy arrives, sending a randomly selected part controlling command to the corresponding part of the service robot till the times for sending a command of the dance controlling strategy is reached, and controlling the service robot to dance to the song.

In the actual control process, the motor of the corresponding part of the service robot may be controlled to complete a complete turning sequence according to the part controlling command corresponding to each command sending timing of the dance controlling strategy, to achieve the desired effect of controlling.

According to the present embodiment, the service robot of the present embodiment can cooperate with the external speaker and dance to the music played by the external speaker, which simulates the dancing of human being fairly well, facilitates the user to have sympathetic response, ensures the effect of the music, enhances the atmosphere of the dancing, and is suitable for situations such as home living. Moreover, according to the present embodiment, the service robot can make different dance gestures following the songs in real time according to the loaded songs, and the dance gestures made by the service robot for the same song are not the same, which greatly enriches the dance movements of the service robot and improves the user experience.

In order to make the dance gestures of the service robot coincide with the beats of the song, in a preferred implementation of the present embodiment, the dance controlling strategy used by the service robot is selected according to the tempo of the song, so that during the playing of the song, the service robot is controlled to dance following the beats of the song.

In order to make the dance gestures of the service robot follow the beats of the song and give the user an impression that the robot is dancing to the rhythms of the song, when setting the command sending interval of the dance controlling strategy, preferably, the command sending interval is set in units of song beat. For example, the command sending interval may be set to be the duration of half of one beat, the duration of one beat, the duration of two beats, or the duration of three beats. It should be noted that the command sending interval of the dance controlling strategy should not be too long. If the command sending interval is too long, the dance gestures of the service robot will be affected and the dance rhythm will become poor. The command sending interval should not be too short either, because the robot's tolerance to fast motion needs to be considered.

In the preferred embodiment, firstly, determining a command sending interval between two successive part controlling commands according to a relation between the tempo of the song and motor speeds of the individual parts of the service robot, to ensure that the motors of the individual parts of the service robot can completely execute the part controlling command, which comprises:

when the tempo of the song is greater than or equal to the motor speed of the service robot, determining that the command sending interval between two successive part controlling commands is greater than or equal to one beat; and when the tempo of the song is less than the motor speed of the service robot, determining that the command sending interval between two successive part controlling commands is less than one beat, or determining that the command sending interval between two successive part controlling commands is greater than or equal to one beat.

For example, when the tempo of the song is less than a first multiple of the motor speed (e.g., one times of the motor speed) and greater than a second multiple of the motor speed (e.g., 0.5 times of motor speed), determining that the minimum command sending interval between two successive part controlling commands is one beat; when the tempo of the song is greater than the first multiple of the motor speed, determining that the minimum command sending interval between two successive part controlling commands is two beats; and when the tempo of the song is less than the second multiple of the motor speed, determining that the minimum command sending interval between two successive part controlling commands is half of one beat; wherein the first multiple of the motor speed is greater than the second multiple of the motor speed.

Next, selecting a dance controlling strategy that satisfies the command sending interval between two successive part controlling commands, and determining a command sending timing when the part controlling command is sent for the first time in the selected dance controlling strategy.

For example, if the tempo of the loaded song is less than the first multiple of the motor speed and greater than the second multiple of the motor speed, a dance controlling strategy wherein the command sending interval is one beat or greater than one beat may be randomly selected as the dance controlling strategy used by the service robot.

After selecting the dance controlling strategy used by the service robot, determining the command sending timing of the part controlling command of the selected dance controlling strategy by the following method:

determining a command sending timing when the part controlling command is sent for the first time in the selected dance controlling strategy; and taking the command sending timing when the part controlling command is sent for the first time as a starting point, and according to the command sending interval of the selected dance controlling strategy, determining a command sending timing when the part controlling command is sent next time, till the times for sending a command of the selected dance controlling strategy is reached.

Exemplarily, when the selected dance controlling strategy is the first dance controlling strategy of the loaded song, the first effective beat of the song may be taken as the command sending timing when the part controlling command is sent for the first time in the selected dance controlling strategy; when the selected dance controlling strategy is not the first dance controlling strategy of the loaded song, the next beat after the song beat corresponding to the command sending timing of the part controlling command which is sent for the last time in the previous dance controlling strategy may be taken as the command sending timing of the part controlling command which is sent for the first time in the dance controlling strategy currently used.

A song may correspond to one dance controlling strategy or two or more dance controlling strategies. When a song corresponds to two or more dance controlling strategies, in the process of playing a song, the service robot is controlled to dance to the song sequentially according to each of the dance controlling strategies. Therefore, in the preferred embodiment, after the times for sending a command of the selected dance controlling strategy is reached, it must be judged whether a command sending timing of the part controlling command sent for the last time in the dance controlling strategy currently used is the play end point of the song. If it is not the play end point of the song, the dance controlling strategy of the song is switched, and a command sending timing of the dance controlling strategy after the switching is re-determined according to the above method. The command sending interval of the dance controlling strategy after the switching is different from that before the switching. If it is the play end point of the song, the dance controlling strategy is switched to a reset controlling strategy of the song, a part controlling command indicated by the reset controlling strategy is determined, and the part controlling command indicated by the reset controlling strategy restores the individual parts of the service robot to gestures before the dance or to specified gestures.

In order to enrich the dance gestures of the service robot, in another preferred implementation of the present embodiment, the part controlling command may be selected by using at least one of the following two ways:

the first way: when the command sending timing of the dance controlling strategy arrives, randomly selecting one part controlling command, or randomly selecting two or more part controlling commands of different parts;

the second way: when the command sending timing of the dance controlling strategy arrives, according to a sending order number of the part controlling command corresponding to the arrived command sending timing, selecting one part controlling command, or selecting two or more part controlling commands of different parts.

In the second way, the dance controlling strategy may be further divided into a plurality of sub-controlling strategies, wherein each of the sub-controlling strategies comprises a pre-controlling strategy and a post-controlling strategy which have the same times for sending a command. In this case, the way may comprise, according to a sending order number of the part controlling command corresponding to the arrived command sending timing, judging which sub-controlling strategy the arrived command sending timing belongs to, which comprises.

when the arrived command sending timing belongs to the pre-controlling strategy of the sub-controlling strategy currently used, randomly selecting one part controlling command, or selecting two or more part controlling commands of different parts; and when the arrived command sending timing belongs to the post-controlling strategy of the sub-controlling strategy currently used, selecting a part controlling command whose action effect corresponds to that of the part controlling command corresponding to the pre-controlling strategy. As an example, when the arrived command sending timing belongs to the post-controlling strategy of the sub-controlling strategy currently used, a part controlling command whose action effect is opposite to that of the part controlling command corresponding to the pre-controlling strategy may be selected.

In the preferred embodiment, when providing corresponding part controlling commands for preset actions of individual parts of the service robot, providing a fixed part controlling command indicating the turning of a body part of the service robot at a fixed angle, and providing a random part controlling command indicating the turning of a body part of the service robot at a random angle. When providing a dance controlling strategy indicating times for sending a command and a command sending interval of the part controlling commands, setting the times for sending a command of the dance controlling strategy to be a fixed value or a random value. In addition, providing dance modes corresponding to songs, wherein the dance mode indicates the selection mode of the part controlling command.

Then, when according to the loaded song, selecting a dance controlling strategy used by the service robot, the method further comprises parsing the dance mode corresponding to the song. If the song corresponds to the fixed dance mode, selecting a dance controlling strategy wherein the times for sending a command is a fixed value; if the song corresponds to a random dance mode, selecting a dance controlling strategy wherein the times for sending a command is a random value; if the song corresponds to a regular dance mode, selecting a dance controlling strategy wherein the times for sending a command is a random value; and if the song corresponds to a mixed dance mode, selecting the dance controlling command according to one of the fixed dance mode, the random dance mode, and the regular dance mode.

Exemplarily, when the command sending timing of the dance controlling strategy arrives, the part controlling command may be selected in the following way:

parsing the dance mode corresponding to the song, and if the song corresponds to the fixed dance mode, when the command sending timing of the dance controlling strategy arrives, randomly selecting one fixed part controlling command, or randomly selecting two or more fixed part controlling commands of different parts;

if the song corresponds to the random dance mode, when the command sending timing of the dance controlling strategy arrives, randomly selecting one random part controlling command, or randomly selecting two or more random part controlling commands of different parts;

if the song corresponds to the regular dance mode, when the command sending timing of the dance controlling strategy arrives, according to a sending order number of the part controlling command corresponding to the arrived command sending timing, selecting one fixed part controlling command or random part controlling command, or selecting two or more fixed part controlling commands or random part controlling commands of different parts. That is, according to a sending order number of the part controlling command corresponding to the arrived command sending timing, judging which sub-controlling strategy the arrived command sending timing belongs to, when the arrived command sending timing belongs to the pre-controlling strategy of the sub-controlling strategy currently used, randomly selecting one fixed part controlling command or random part controlling command, or selecting two or more fixed part controlling commands or random part controlling commands of different parts; and when the arrived command sending timing belongs to the post-controlling strategy of the sub-controlling strategy currently used, selecting a part controlling command whose action effect corresponds to that of the part controlling command corresponding to the pre-controlling strategy.

If the song corresponds to the mixed dance mode, controlling the dance controlling strategy currently used to select a part controlling command according to one of the fixed dance mode, the random dance mode, and the regular dance mode.

In order to explain the method for controlling dancing of a service robot in more detail, the present embodiment will be specifically described by means of the following implementations.

In the present embodiment, provides corresponding part controlling commands for preset actions of individual parts of the service robot in advance, provides a dance controlling strategy indicating times for sending a command and a command sending interval of the part controlling commands in advance, and provides dance modes corresponding to songs, wherein the dance mode indicates a selection mode of the part controlling command and/or the dance controlling strategy.

For the convenience of description, it is assumed that the head, body and arms of the service robot can be turned correspondingly under the control of the motor. Based on this assumption, the part controlling commands preset in the present embodiment include a head controlling command, a body controlling command, a left arm controlling command, and a right arm controlling command. Each of the part controlling command comprises a fixed part controlling command and a random part controlling command. The fixed part controlling command indicates that the turning angle of a certain body part of the service robot is fixed, and the random part controlling command indicates that the turning angle of a certain body part of the service robot is random.

For example, it is assumed that under the control of the motor, the head of the service robot can be turned left or right in the horizontal direction and turned up or down in the vertical direction; the body of the service robot can be turned left and right in the horizontal direction; the arms of the service robot can be turned up and down in the vertical direction.

Exemplarily, the ranges of the head turning of the service robot leftwardly and rightwardly in the horizontal direction are both 15°, and the ranges of the head turning of the service robot upwardly and downwardly in the vertical direction are both 10°. For the head of the service robot, there are 4 fixed part controlling commands and 4 random part controlling commands. The 4 fixed part controlling commands are individually a fixed part controlling command for turning leftwardly by 5°, a fixed part controlling command for turning rightwardly by 5°, a fixed part controlling command for turning upwardly by 5°, and a fixed part controlling command for turning downwardly by 5°. The 4 random part controlling commands are individually a random part controlling command for randomly turning leftwardly by 5° to 15°, a random part controlling command for randomly turning rightwardly by 5° to 15°, a random part controlling command for randomly turning upwardly by 5° to 10°, and a random part controlling command for randomly turning downwardly by 5° to 10°.

The ranges of the body turning of the service robot leftwardly and rightwardly in the horizontal direction are both 15°. For the body of the service robot, there are 2 fixed part controlling commands and 2 random part controlling commands. The 2 fixed part controlling commands are individually a fixed part controlling command for turning leftwardly by 3° and a fixed part controlling command for turning rightwardly by 3°. The 2 random part controlling commands are individually a random part controlling command for randomly turning leftwardly by 3° to 15°, and a random part controlling command for randomly turning rightwardly by 3° to 15°.

The ranges of turning upwardly and downwardly of the left arm (or the right arm) of the service robot in the vertical direction are both 30°. For the left arm (or the right arm) of the service robot, there are 2 fixed part controlling commands and 2 random part controlling commands. The 2 fixed part controlling commands are individually a fixed part controlling command for turning upwardly by 5° and a fixed part controlling command for turning downwardly by 5°. The 2 random part controlling commands are individually a random part controlling command for randomly turning upwardly by 5° to 15° and a random part controlling command for randomly turning downwardly by 5° to 15°.

Since a bar of most songs comprises four beats, in the present embodiment, preferably, the maximum command sending interval is set to three beats, and the minimum command sending interval is set to half of one beat. That is, in the present embodiment, a total of four types of dance controlling strategies are provided, which include: a dance controlling strategy wherein the command sending interval is half of one beat, a dance controlling strategy in which the command sending interval is one beat, a dance controlling strategy in which the command sending interval is two beats, and a dance controlling strategy in which the command sending interval is three beats.

The command sending time quantities for each of the dance controlling strategies may be either a fixed value or a random value. For example, for a dance controlling strategy in which the command sending interval is half of one beat, if the times for sending a command is a fixed value, the fixed value is 4; and if the times for sending a command is a random value, the random value is R, R=N×2, and N is a positive integer that is greater than or equal to 1 and less than or equal to 4. For a dance controlling strategy in which the command sending interval is one beat, if the times for sending a command is a fixed value, the fixed value may be 4, 8, or 12; and if the times for sending a command is a random value, the random value is R, R=N×4, and N is a positive integer that is greater than or equal to 1 and less than or equal to 4. For a dance controlling strategy in which the command sending interval is two beats, if the times for sending a command is a fixed value, the fixed value may be 2, 4, 6, or 8; and if the times for sending a command is a random value, the random value is R, R=N×2, and N is a positive integer that is greater than or equal to 1 and less than or equal to 8. For a dance controlling strategy in which the command sending interval is three beats, if the times for sending a command is a fixed value, the fixed value may be 1 or 2; and if the times for sending a command is a random value, the random value is R, R=N, N is a positive integer that is greater than or equal to 1 and less than or equal to 8.

N is a random factor, and the value ranges of the random factors of each of the dance controlling strategies may be the same or different.

For each of the dance controlling strategies in which the times for sending a command is a random value, the dance controlling strategy may be divided into a plurality of sub-controlling strategies, and each of the sub-controlling strategies comprises a pre-controlling strategy and a post-controlling strategy which have the same times for sending a command.

Figure 2:
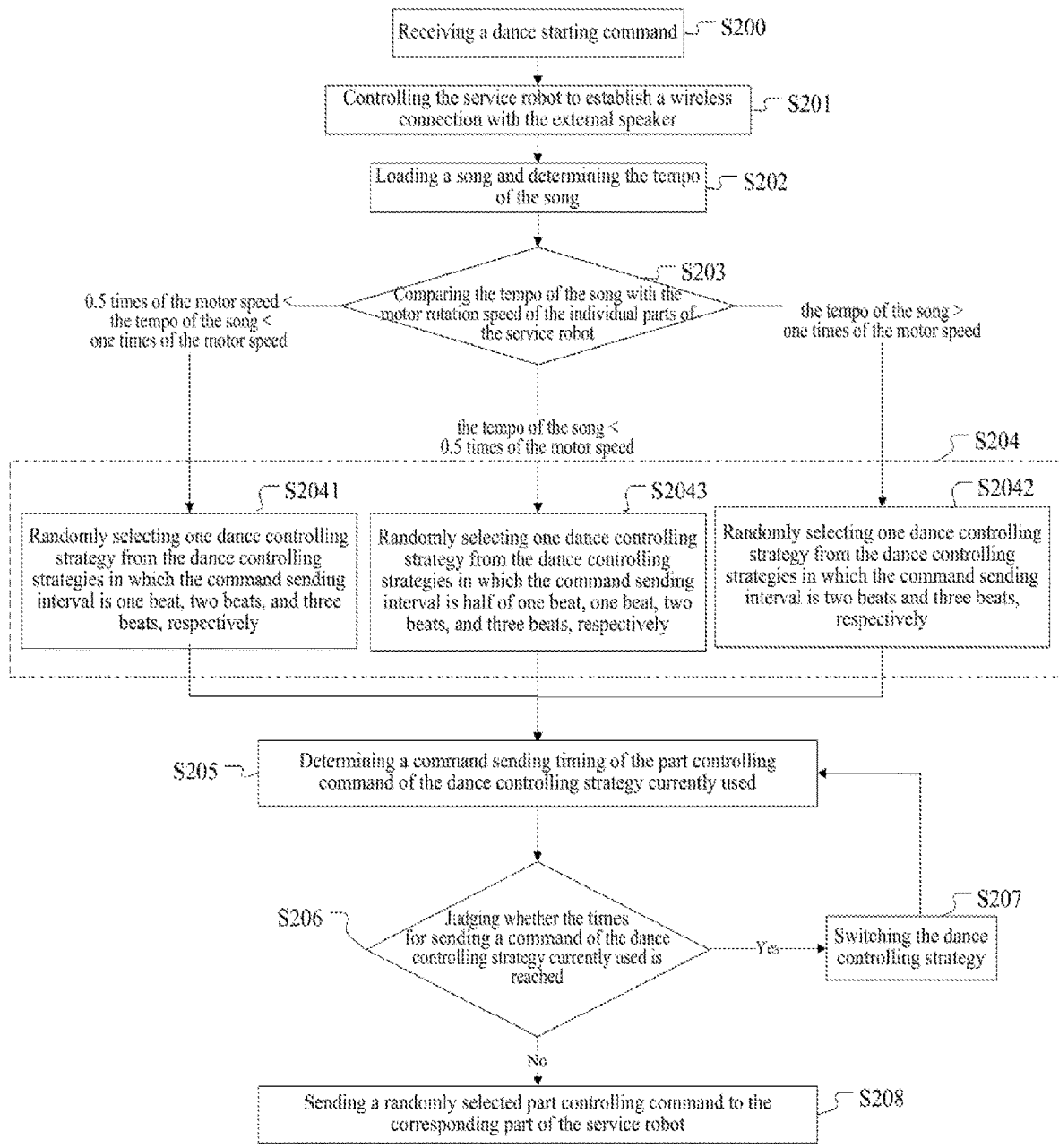
FIG. 2 is a flowchart of a method for controlling dancing of a service robot according to another embodiment of the present disclosure.

After the part controlling command, the dance controlling strategy, and the dance mode of the present embodiment are provided, the service robot is subjected to the dance control according to the control method shown in FIG. 2. FIG. 2 is a flowchart of a method for performing dancing control on a service robot according to an embodiment. The method comprises:

S200, receiving a dance starting command.

In a specific implementation, the service robot may receive a voice dance starting command sent by the user by means of voice interaction. When the format or authority of the voice dance starting command is incorrect, the service robot is controlled to send a startup failure prompt tone to the user, and waits to receive the next dance starting command; and when the format or authority of the voice dance starting command is correct, step S201 is executed.

S201, controlling the service robot to establish a wireless connection with the external speaker. The service robot may establish the wireless connection with the external speaker by using a Bluetooth connection protocol, a Wifi connection protocol or a ZigBee connection protocol.

S202, loading a song and determining the tempo of the song.

In a specific implementation, the service robot may be controlled to load songs from its song library or from an external audio source.

In the present embodiment, the tempo of the loaded song may be determined by tempo software provided by the third party.

The execution sequence of step S201 and step S202 is not specifically limited in the present embodiment. In practical applications, step S201 may be executed before step S202, or after step S202, or at the same time as step S202.

S203, comparing the tempo of the song with the motor rotation speed of the individual parts of the service robot, and according to the comparison result executing step S204.

Step S204 comprises: if the tempo of the song is less than one times of the motor speed and greater than 0.5 times of the motor speed, executing step S2041; if the tempo of the song is greater than one times of the motor speed, executing step S2042; and if the tempo of the song is less than 0.5 times of the motor speed, executing step S2043.

S2041: randomly selecting one dance controlling strategy from the dance controlling strategies in which the command sending interval is one beat, two beats, and three beats, respectively.

S2042: randomly selecting one dance controlling strategy from the dance controlling strategies in which the command sending interval is two beats and three beats, respectively.

S2043: randomly selecting one dance controlling strategy from the dance controlling strategies in which the command sending interval is half of one beat, one beat, two beats, and three beats, respectively.

S205, determining a command sending timing of the part controlling command of the dance controlling strategy currently used.

S206, judging whether the times for sending a command of the dance controlling strategy currently used is reached, and if yes, executing step S207, and if no, executing step S208.

S207, switching the dance controlling strategy, and returning to step S205. The command sending interval of the dance controlling strategy after the switching is different from the command sending interval of the dance controlling strategy before the switching.

S208, when the command sending timing of the dance controlling strategy currently used arrives, sending a randomly selected part controlling command to the corresponding part of the service robot, and controlling the service robot to dance to the song.

The method of FIG. 2 comprises: when the play end point of the song is reached, sending a reset controlling command indicated by the reset controlling strategy to the individual parts of the service robot, to restore the individual parts of the service robot to gestures before the dance or to specified gestures.

In the actual control process, after the service robot loads the song, the method may parse the dance mode corresponding to the song, and control the service robot to dance following the beats of the song according to the dance mode corresponding to the song.

In order to describe in detail the method for controlling the service robot to dance following the beats of the song in corresponding dance modes, the present embodiment will illustrates the method in the fixed dance mode and the method in the regular dance mode through two specific implementations respectively.

In whichever dance mode, the method for controlling the service robot to dance following the beats of the song needs to, when a dance starting command is received, establish a wireless connection with an external speaker located outside the service robot, load a song from a song library of the service robot, and determine that the song currently loaded by the service robot is the song to be played by the external speaker. In other words, the steps S200 to S202 in FIG. 2 are executed in both of the following two specific implementations of the present embodiment. Thus, the execution process will not be repeated in the following two specific implementations of the present embodiment.

Figure 3:
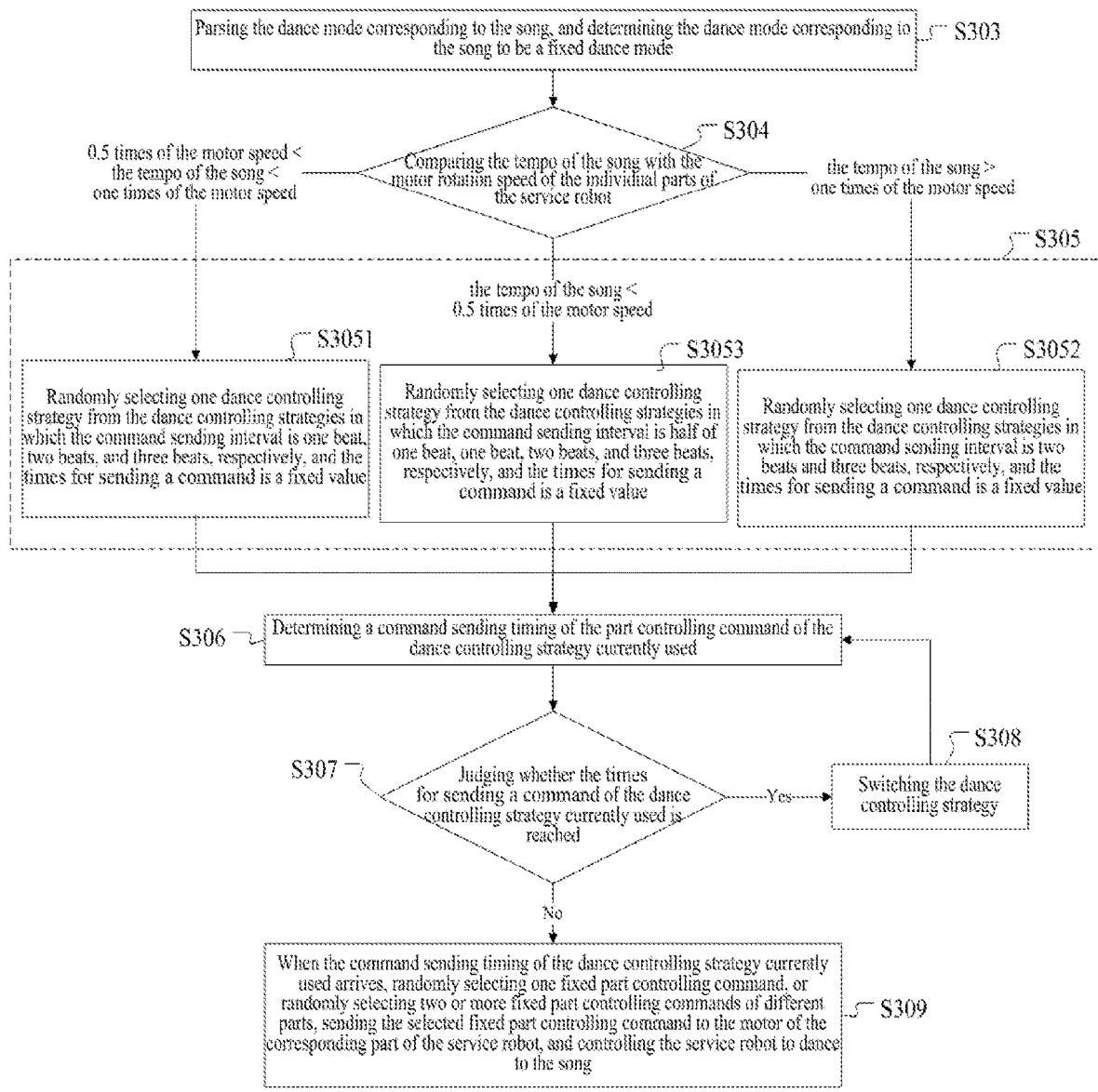
FIG. 3 is a flowchart of a method for controlling the service robot to dance following the beats of a song in a fixed dance mode according to another embodiment of the present disclosure.

In a specific implementation of the present embodiment, the method for controlling the service robot to dance following the beats of the song in the fixed dance mode is shown in FIG. 3. The method in FIG. 3 comprises:

S303, parsing the dance mode corresponding to the song, and determining the dance mode corresponding to the song to be a fixed dance mode.

S304, comparing the tempo of the song with the motor rotation speed of the individual parts of the service robot, and executing step S305 according to the comparison result.

Step S305 comprises: if the tempo of the song is less than one times of the motor speed and greater than 0.5 times of the motor speed, executing step S3051; if the tempo of the song is greater than one times of the motor speed, executing step S3052; and if the tempo of the song is less than 0.5 times of the motor speed, executing step S3053.

S3051: randomly selecting one dance controlling strategy from the dance controlling strategies in which the command sending interval is one beat, two beats, and three beats, respectively, and the times for sending a command is a fixed value.

S3052: randomly selecting one dance controlling strategy from the dance controlling strategies in which the command sending interval is two beats and three beats, respectively, and times for sending a command is a fixed value.

S3053: randomly selecting one dance controlling strategy from the dance controlling strategies in which the command sending interval is half of one beat, one beat, two beats, and three beats, respectively, and the times for sending a command is a fixed value.

For example, if the tempo of the loaded song is less than one times of the motor speed and greater than 0.5 times of the motor speed, one of the following dance controlling strategies may be selected: a dance controlling strategy in which the command sending interval is one beat and the times for sending a command is 4 (or the times for sending a command is 8, or the times for sending a command is 12), a dance controlling strategy in which the command sending interval is two beats and the times for sending a command is 2 (or the times for sending a command is 4, or the times for sending a command is 6, or the times for sending a command is 8), and a dance controlling strategy in which the command sending interval is three beats and the times for sending a command is 1 (or the times for sending a command is 2).

S306, determining a command sending timing of the part controlling command of the dance controlling strategy currently used.

S307, judging whether the times for sending a command of the dance controlling strategy currently used is reached. If yes, executing step S308, and if no, executing step S309.

S308, switching the dance controlling strategy, and returning to step S306. The command sending interval of the dance controlling strategy after the switching is different from the command sending interval of the dance controlling strategy before the switching.

Assuming that in the dance controlling strategy currently used, the command sending interval is one beat, and the times for sending a command is 4, when the times for sending a command of the dance controlling strategy currently used is reached, the dance controlling strategy is switched, and in the dance controlling strategy after the switching, the command sending interval is two beats and the times for sending a command is 2 (or the times for sending a command is 4, or the times for sending a command is 6, or the times for sending a command is 8); or, in the dance controlling strategy after the switching, the command sending interval is three beats, and the times for sending a command is 1 (or the times for sending a command is 2).

S309, when the command sending timing of the dance controlling strategy currently used arrives, randomly selecting one fixed part controlling command, or randomly selecting two or more fixed part controlling commands of different parts, sending the selected fixed part controlling command to the motor of the corresponding part of the service robot, and controlling the service robot to dance to the song.

The dance control of the service robot in the fixed dance mode is completed through the above steps S303 to S309.

In the present embodiment, the method for controlling dancing of a service robot in the random dance mode is substantially the same as the control method in the fixed dance mode, except that in the random dance mode, when the dance controlling strategy is selected based on the comparison result between the tempo of the song and the motor speed of the individual parts of the service robot, the times for sending a command of the selected dance controlling strategy is a random value; and when the command sending timing of the dance controlling strategy currently used arrives, one random part controlling command is randomly selected, or two or more random part controlling commands of different parts are randomly selected.

Figure 4:
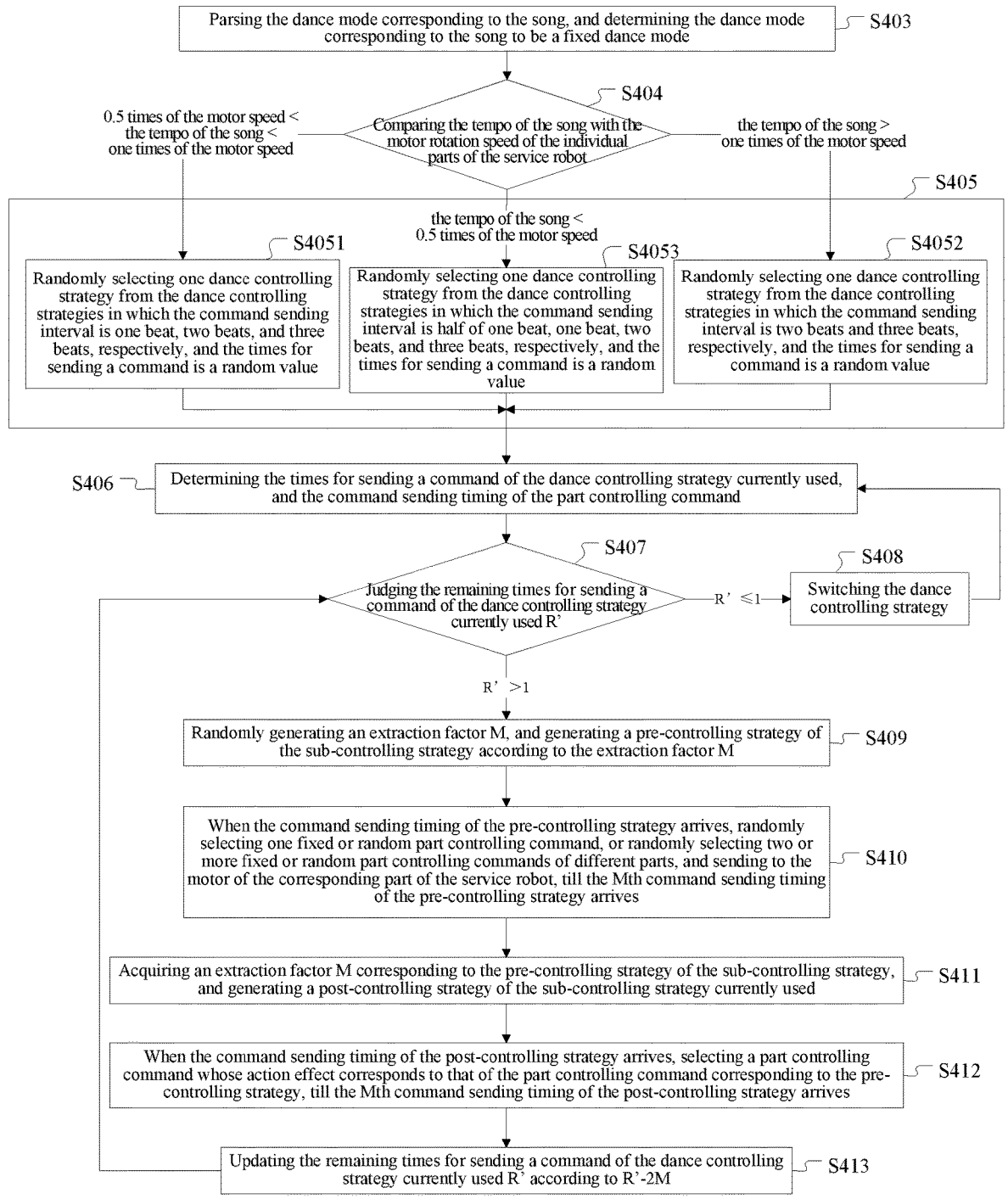
FIG. 4 is a flowchart of a method for controlling the service robot to dance following the beats of a song in a regular dance mode according to another embodiment of the present disclosure.

In another specific implementation of the present embodiment, a method for controlling the service robot to dance following the beats of the song in the regular dance mode is shown in FIG. 4. The method in FIG. 4 comprises:

S403, parsing the dance mode corresponding to the song, and determining the dance mode corresponding to the song to be a regular dance mode.

S404, comparing the tempo of the song with the motor rotation speed of the individual parts of the service robot, and executing step S405 according to the comparison result.

Step S405 comprises: if the tempo of the song is less than one times of the motor speed and greater than 0.5 times of the motor speed, executing step S4051; if the tempo of the song is greater than one times of the motor speed, executing step S4052; and if the tempo of the song is less than 0.5 times of the motor speed, executing step S4053.

S4051: randomly selecting one dance controlling strategy from the dance controlling strategies in which the command sending interval is one beat, two beats, and three beats, respectively, and the times for sending a command is a random value.

S4052: randomly selecting one dance controlling strategy from the dance controlling strategies in which the command sending interval is two beats and three beats, respectively, and the times for sending a command is a random value.

S4053: randomly selecting one dance controlling strategy from the dance controlling strategies in which the command sending interval is half of one beat, one beat, two beats, and three beats, respectively, and the times for sending a command is a random value.

For example, if the tempo of the loaded song is less than one times of the motor speed and greater than 0.5 times of the motor speed, one of the following dance controlling strategies may be selected: a dance controlling strategy in which the command sending interval is one beat and the times for sending a command is R=N×4 (N is a positive integer that is greater than or equal to 1 and less than or equal to 4), a dance controlling strategy wherein the command sending interval is two beats and the times for sending a command is R=N×2 (N is a positive integer that is greater than or equal to 1 and less than or equal to 8), and a dance controlling strategy wherein the command sending interval is three beats and the times for sending a command is R=N (N is a positive integer that is greater than or equal to 1 and less than or equal to 8).

S406, determining the times for sending a command of the dance controlling strategy currently used, and the command sending timing of the part controlling command.

According to the value range of the random factor N of the dance controlling strategy currently used, a random factor numerical value n is generated, and the times for sending a command R of the dance controlling strategy is determined according to the generated random factor numerical value n. Assuming that the command sending interval of the dance controlling strategy currently used is one beat, and the times for sending a command is R=N×4 (N is a positive integer that is greater than or equal to 1 and less than or equal to 4), if the randomly obtained random factor numerical value n=3, the times for sending a command of the dance controlling strategy is R=6.

S407, judging the remaining times for sending a command of the dance controlling strategy currently used R', and if the remaining times for sending a command of the dance controlling strategy currently used R'≤1, executing step S408, and if no, executing step S409.

S408, switching the dance controlling strategy, and returning to step S406. The command sending interval of the dance controlling strategy after the switching is different from the command sending interval of the dance controlling strategy before the switching.

Assuming that in the dance controlling strategy currently used, the command sending interval is one beat, and the times for sending a command is R=N×4 (N is a positive integer that is greater than or equal to 1 and less than or equal to 4), when the remaining times for sending a command of the dance controlling strategy currently used R' is ≤1, that is, the remaining times for sending a command of the dance controlling strategy currently used R'=1 or R'=0, the dance controlling strategy is switched, and in the dance controlling strategy after the switching, the command sending interval is two beats, and the times for sending a command is R=N×2 (N is a positive integer that is greater than or equal to 1 and less than or equal to 8); or, in the dance controlling strategy after the switching, the command sending interval is three beats, and the times for sending a command is R=N (N is a positive integer that is greater than or equal to 1 and less than or equal to 8).

S409, randomly generating an extraction factor M, and generating a pre-controlling strategy of the sub-controlling strategy according to the extraction factor M. The generated pre-controlling strategy comprises M times of the times for sending a command, wherein M is a positive integer that is greater than or equal to 1 and less than or equal to R'/2.

It should be noted that the numerical values of the extraction factors M generated each time are not necessarily the same, as long as 1≤M≤R'/2 is satisfied.

S410: when the command sending timing of the pre-controlling strategy arrives, randomly selecting one fixed or random part controlling command, or randomly selecting two or more fixed or random part controlling commands of different parts, and sending to the motor of the corresponding part of the service robot, till the Mth command sending timing of the pre-controlling strategy arrives; and after the part controlling command selected at the Mth command sending timing is sent to the motor of the corresponding part of the service robot, executing step S411.

S411, acquiring an extraction factor M corresponding to the pre-controlling strategy of the sub-controlling strategy, and generating a post-controlling strategy of the sub-controlling strategy currently used. The generated post-controlling strategy also comprises M times of the times for sending a command. In other words, the pre-controlling strategy and the post-controlling strategy of the sub-controlling strategy include the same times for sending a command.

S412, when the command sending timing of the post-controlling strategy arrives, selecting a part controlling command whose action effect corresponds to that of the part controlling command corresponding to the pre-controlling strategy, till the Mth command sending timing of the post-controlling strategy arrives; and after the part controlling command selected at the Mth command sending timing of the post-controlling strategy is sent to the motor of the corresponding part of the service robot, executing step S413.

When the arrived command sending timing belongs to the post-controlling strategy of the sub-controlling strategy currently used, a part controlling command whose action effect is opposite to that of the part controlling command corresponding to the pre-controlling strategy may be selected.

Based on the above assumption, the times for sending a command of the pre-controlling strategy is R=6. If the extraction factor randomly generated in step S409 is M=2, in step S410, when the first command sending timing of the pre-controlling strategy arrives, a part controlling command whose action effect is turning the head by 8° rightwardly is selected; and when the second command sending timing arrives, a part controlling command whose action effect is turning the body by 3° leftwardly and a part controlling command whose action effect is turning the right arm by 5° upwardly are selected. Therefore, in step S412, when the first command sending timing of the post-controlling strategy arrives, the part controlling command whose action effect is turning by 8° leftwardly may be selected; and when the second command sending timing arrives, the part controlling command whose action effect is turning the body by 3° rightwardly and the part controlling command whose action effect is turning the right arm by 5° downwardly may be selected.

S413, updating the remaining times for sending a command of the dance controlling strategy currently used R' according to R'−2M, and returning to step S407.

The remaining times for sending a command R' is R'=R before the first sub-controlling strategy of the dance controlling strategy currently used is executed.

Accordingly, the dance control of the service robot in the regular dance mode is completed through the above steps S403 to S413. The dance gestures of the service robot can be controlled to be more regular and coordinated in the regular dance mode.

Correspondingly to the above embodiment of the method for controlling dancing of a service robot, an embodiment of the present disclosure further provides an apparatus for controlling dancing of a service robot.

Figure 5:
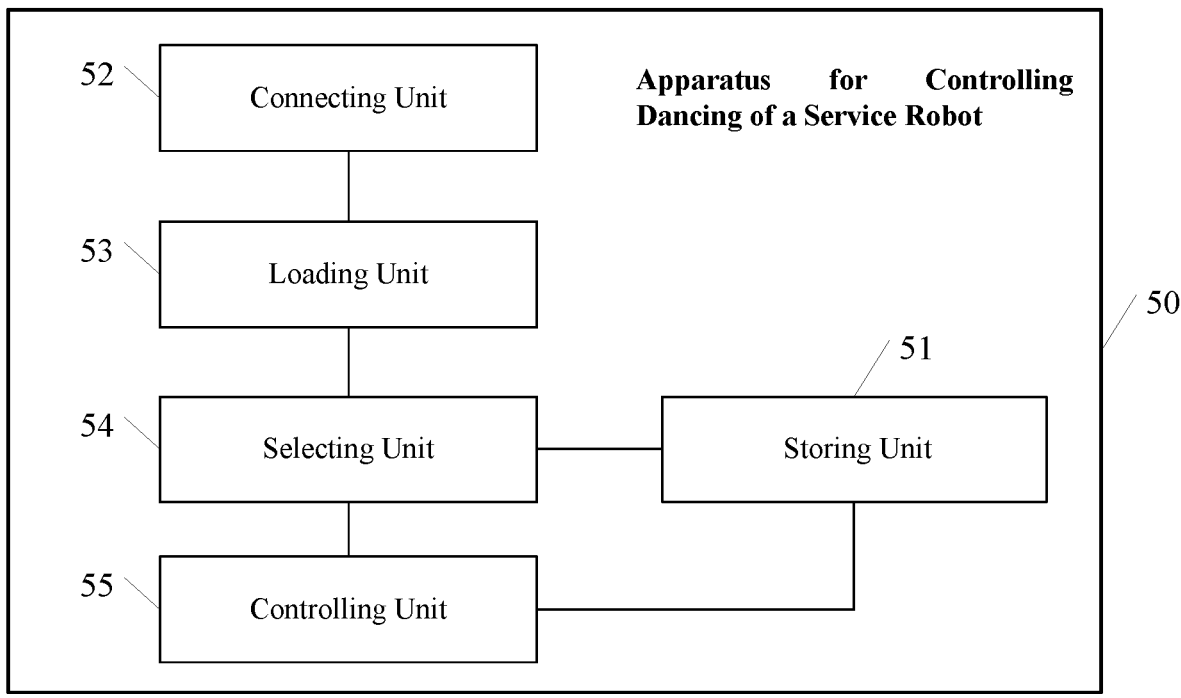
FIG. 5 is a structural block diagram of an apparatus for controlling dancing of a service robot according to still another embodiment of the present disclosure.

FIG. 5 is a structural block diagram of an apparatus for controlling dancing of a service robot according to an embodiment of the present disclosure. The apparatus for controlling dancing of a service robot 50 comprises:

a storing unit 51 is for, storing corresponding part controlling commands which are provided for preset actions of individual parts of the service robot, and storing a dance controlling strategy indicating times for sending a command and a command sending interval of the part controlling commands;

a connecting unit 52 is for, when receiving a dance starting command, establishing a wireless connection with an external speaker located outside the service robot;

a loading unit 53 is for, when receiving a dance starting command, loading a song from a song library of the service robot, and determining that the song currently loaded by the service robot is the song to be played by the external speaker;

a selecting unit 54 is for, selecting a dance controlling strategy used by the service robot according to the song from the storing unit 51, and determining a command sending timing of the part controlling command of the dance controlling strategy; and a controlling unit 55 is for, when the external speaker is playing the song and the command sending timing of the dance controlling strategy arrives, sending a randomly selected part controlling command to the corresponding part of the service robot till the times for sending a command of the dance controlling strategy is reached, and controlling the service robot to dance to the song.

In a preferred implementation of the present embodiment, the selecting unit 54 is for, according to a tempo of the song, selecting a dance controlling strategy used by the service robot; or, the storing unit 51 is further for storing a corresponding relation between a song and a dance controlling strategy, and correspondingly, the selecting unit 54 is for, according to the corresponding relation, selecting a dance controlling strategy used by the service robot.

Specifically, the selecting unit 54 comprises a command sending timing determining module; and the command sending timing determining module is for determining a command sending interval between two successive part controlling commands according to a relation between the tempo of the song and motor speeds of the individual parts of the service robot; wherein, when the tempo of the song is greater than or equal to the motor speed of the service robot, the command sending timing determining module determines that the command sending interval between two successive part controlling commands is greater than or equal to one beat; and when the tempo of the song is less than the motor speed of the service robot, the command sending timing determining module determines that the command sending interval between two successive part controlling commands is less than one beat, or the command sending timing determining module determines that the command sending interval between two successive part controlling commands is greater than or equal to one beat.

For example, when the tempo of the song is less than a first multiple of the motor speed and greater than a second multiple of the motor speed, the command sending timing determining module determines that the minimum command sending interval between two successive part controlling commands is one beat;

when the tempo of the song is greater than the first multiple of the motor speed, the command sending timing determining module determines that the minimum command sending interval between two successive part controlling commands is two beats; and when the tempo of the song is less than the second multiple of the motor speed, the command sending timing determining module determines that the minimum command sending interval between two successive part controlling commands is half of one beat;

wherein the first multiple of the motor speed is greater than the second multiple of the motor speed.

The command sending timing determining module is further for selecting a dance controlling strategy that satisfies the command sending interval between two successive part controlling commands, determining a command sending timing when the part controlling command is sent for the first time in the selected dance controlling strategy; and taking the command sending timing when the part controlling command is sent for the first time as a starting point, and determining a command sending timing when the part controlling command is sent next time according to the command sending interval of the selected dance control strategy, till the times for sending a command of the selected dance controlling strategy is reached.

For example, the command sending timing determining module is for: when the tempo of the song is less than a first multiple of the motor speed and greater than a second multiple of the motor speed, determining that the minimum command sending interval between two successive part controlling commands is one beat;

when the tempo of the song is greater than the first multiple of the motor speed, determining that the minimum command sending interval between two successive part controlling commands is two beats; and when the tempo of the song is less than the second multiple of the motor speed, determining that the minimum command sending interval between two successive part controlling commands is half of one beat;

wherein the first multiple of the motor speed is greater than the second multiple of the motor speed.

Preferably, the selecting unit 54 of the present embodiment further comprises a dance controlling strategy switching module; and the dance controlling strategy switching module is for, after the times for sending a command of the selected dance controlling strategy is reached, judging whether a command sending timing of a part controlling command sent for the last time of a dance controlling strategy currently used is a play end point of the song;

if not, switching the dance controlling strategy of the song, and re-determining times for sending a command, a command sending interval and a command sending timing of the dance controlling strategy after the switching by using the command sending timing determining module, wherein the command sending interval of the dance controlling strategy after the switching is different from that before the switching;

if yes, switching to a reset controlling strategy of the song, and determining a reset controlling command indicated by the reset controlling strategy, wherein the reset controlling command restores the individual parts of the service robot to gestures before the dance or to specified gestures.

In another preferred implementation of the present embodiment, the controlling unit 55 comprises a part controlling command selecting module;

the part controlling command selecting module is for, when the command sending timing of the dance controlling strategy arrives, randomly selecting one part controlling command from the storing unit 51, or randomly selecting two or more part controlling commands of different parts from the storing unit 51; or the part controlling command selecting module is for, according to a sending order number of the part controlling command corresponding to the arrived command sending timing, selecting one part controlling command from the storing unit 51, or selecting two or more part controlling commands of different parts from the storing unit 51.

When the part controlling command selecting module selects the part controlling command according to a sending order number of the part controlling command corresponding to the arrived command sending timing, the dance controlling strategy needs to be divided into a plurality of sub-controlling strategies in advance, wherein each of the sub-controlling strategies comprises a pre-controlling strategy and a post-controlling strategy which have the same times for sending a command.

Correspondingly, the part controlling command selecting module is for:

according to a sending order number of the part controlling command corresponding to the arrived command sending timing, judging which sub-controlling strategy the arrived command sending timing belongs to;

when the arrived command sending timing belongs to the pre-controlling strategy of the sub-controlling strategy currently used, randomly selecting one part controlling command from the storing unit 51, or selecting two or more part controlling commands of different parts from the storing unit 51; and when the arrived command sending timing belongs to the post-controlling strategy of the sub-controlling strategy currently used, selecting a part controlling command whose action effect corresponds to that of the part controlling command corresponding to the pre-controlling strategy from the storing unit 51.

In a specific implementation of the present embodiment, the storing unit 51 further stores a dance mode indicating a selection mode of the part controlling command and/or the dance controlling strategy.

The controlling unit 55 further comprises a dance mode parsing module for parsing the dance mode corresponding to the song; and the part controlling command selecting module is for:

if the dance mode of the song is parsed by the dance mode parsing module to be a fixed dance mode, when the command sending timing of the dance controlling strategy arrives, randomly selecting one fixed part controlling command from the storing unit 51, or randomly selecting two or more fixed part controlling commands of different parts from the storing unit 51;

if the dance mode of the song is parsed by the dance mode parsing module to be a random dance mode, when the command sending timing of the dance controlling strategy arrives, randomly selecting one random part controlling command from the storing unit 51, or randomly selecting two or more random part controlling commands of different parts from the storing unit 51;

if the dance mode of the song is parsed by the dance mode parsing module to be a regular dance mode, when the command sending timing of the dance controlling strategy arrives, according to a sending order number corresponding to the arrived command sending timing, selecting one fixed part controlling command or random part controlling command from the storing unit 51, or selecting two or more fixed part controlling commands or random part controlling commands of different parts from the storing unit 51; and if the dance mode of the song is parsed by the dance mode parsing module to be a mixed dance mode, controlling the dance controlling strategy currently used to select a part controlling command according to one of the fixed dance mode, the random dance mode, and the regular dance mode.

Since the apparatus embodiment substantially corresponds to the method embodiment, it can be referred to the description of the method embodiment. The apparatus embodiment described above is merely illustrative. The units described above as separate members may be, or may not be, physically separated. The components shown as a unit may be, or may not be, a physical unit; that is they may be located in one place, or may be distributed on a plurality of network units. It is possible to select part or all of the units according to actual needs to achieve the aim of the implementations of the present embodiment. Those of ordinary skill in the art can understand and implement them without paying any creative effort.

Figure 6:
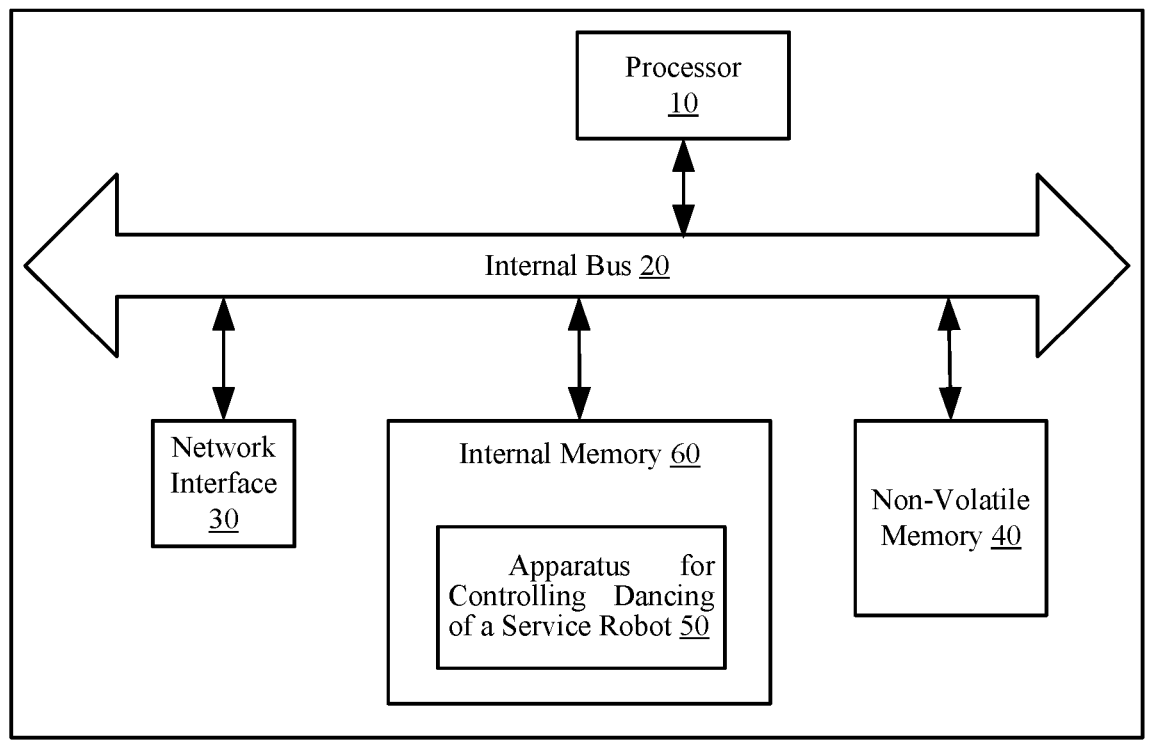
FIG. 6 is a schematic diagram showing the hardware structure of an apparatus for controlling dancing of a service robot according to an embodiment of the present disclosure.

The apparatus for controlling dancing of a service robot 50 according to the present disclosure may be implemented by software, or may be implemented by hardware or a combination of hardware and software. Taking the software implementation as an example, referring to FIG. 6, the machine executable instruction in a non-volatile memory 40 that is corresponding to the apparatus for controlling dancing of a service robot 50 may be read into an internal memory 60 by a processor 10. At the hardware level, as shown in FIG. 6, which is a hardware structure diagram of the apparatus of the present disclosure, besides the processor 10, an internal bus 20, a network interface 30, the internal memory 60, and the non-volatile memory 40 shown in FIG. 6, the apparatus may comprise other hardware according to the actual function of the network device, which is not described in detail here.

In various embodiments, the non-volatile memory 40 may be a storage drive (such as a hard drive), a solid hard disc, any type of storage disc (such as a compact disc, a DVD, etc.), or a similar storage medium, or a combination thereof. The internal memory 60 may be a RAM (Radom Access Memory), a volatile memory, and a flash memory.

The apparatus for controlling dancing of a service robot of the present disclosure traditionally comprises a processor and a computer program product or a computer readable medium in the form of memory. The memory can be an electronic memory such as a flash memory, an EEPROM, an EPROM, a hard disk or a ROM and the like. The memory has a storage space for executing the program code of any method step of the above method. For example, the storage space for the program code can comprise each of the program codes for individually implementing the steps of the above method. These program codes can be read out or written in from one or more computer program products to the one or more computer program products. The computer program products comprise program code carriers such as hard disk, compact disk (CD), memory card or floppy disk and the like. Such computer program products are generally portable or fixed storage units. The storage units can be similarly disposed memory segments, storage spaces or the like. The program code can for example be compressed in appropriate forms. Generally, the storage units comprise computer readable codes for executing the method steps according to the present disclosure, that is, codes that can be read by for example processors, and when the codes are executed, the apparatus for controlling dancing of a service robot executes each of the steps of the method described above.

It should be noted that the terms "comprise", "include" or any other variations thereof are intended to cover nonexclusive incorporations, so that a process, method, article, or device comprising a series of elements does not only comprise those elements listed, but also comprises other elements which are not listed, or the elements that are inherent to such a process, method, article, or device. In the case that there is no more limitation, an element defined by the wording "comprising a" does not exclude the additional same element in the process, method, article or device that comprises the element.

The description provided herein illustrates many concrete details. However, it can be understood that, the embodiments of the present disclosure can be implemented without the concrete details. In some embodiments, well known methods, structures and techniques are not described in detail, so as not to obscure the understanding of the description. The languages used in the description are chosen mainly for sake of readability and teaching, and are not intended to interpret or define the subject matter of the present disclosure.

What is claimed is:

1. A method for controlling dancing of a service robot by providing a part controlling command corresponding to a preset action of a part of the service robot, and providing a dance controlling strategy indicating a time point for sending the part controlling command and a time duration for sending the part controlling command, the method comprising:
    establishing a wireless connection with an external speaker located outside the service robot in response to receiving a dance starting command, loading a song from a song library of the service robot, and determining that the song loaded from the song library is a song to be played by the external speaker;
    selecting the dance controlling strategy to be used by the service robot in response to the song loaded from the song library, and determining the time point for sending the part controlling command and the time duration for sending the part controlling command in response to the dance controlling strategy;
    playing the song loaded from the song library via the external speaker;
    randomly selecting the part controlling command from a plurality of part controlling commands;
    sending the part controlling command to the part of the service robot for the time duration for sending the part controlling command in response to reaching the time point within the dance controlling strategy, and controlling the service robot to dance to the song loaded from the song library in response to the part controlling command.

2. The method according to claim 1, wherein the dance controlling strategy is selected in response to at least one of:
    a tempo of the song; and,
    a stored relationship between the song and the dance controlling strategy.

3. The method according to claim 2, wherein selecting the dance controlling strategy used by the service robot according to the tempo of the song includes:
    determining a time interval for sending two successive part controlling commands according to a relation between the tempo of the song and a motor speed of the part of the service robot, and selecting the dance controlling strategy in response to the time interval for sending two successive part controlling commands such that
    when the tempo of the song is greater than or equal to the motor speed, the time interval for sending two successive part controlling commands is greater than or equal to one beat and when the tempo of the song is less than the motor speed, the time interval for sending two successive part controlling commands is less than one beat.

4. The method according to claim 3, wherein determining a time interval for sending two successive part controlling commands according to a relation between the tempo of the song and the motor speed of the part of the service robot includes:
    determining a minimum time interval for sending two successive part controlling commands is one beat when the tempo of the song is less than a first multiple of the motor speed and greater than a second multiple of the motor speed;
    determining the minimum time interval for sending two successive part controlling commands is two beats when the tempo of the song is greater than the first multiple of the motor speed; and
    determining the minimum time interval for sending two successive part controlling commands is half of one beat when the tempo of the song is less than the second multiple of the motor speed;
    wherein the first multiple of the motor speed is greater than the second multiple of the motor speed.

5. The method according to claim 3, selecting the dance controlling strategy used by the service robot according to the tempo of the song further includes:
    determining the time point for sending the part controlling command sent last time in the dance controlling strategy is a play end point of the song;
    switching the dance controlling strategy, and re-determining times for sending the part controlling commands and a time interval for sending the part controlling commands of a dance controlling strategy after the switching in response to the time point for sending the part controlling command sent last time in the selected dance controlling strategy not being the play end point of the song, wherein the time interval of the part controlling commands of the dance controlling strategy after the switching is different from that before the switching; and switching to a reset controlling strategy of the song loaded from the song library, and determining a reset controlling command indicated by the reset controlling strategy in response to the time point for sending the part controlling command sent last time in the dance controlling strategy being the play end point of the song, wherein the reset controlling command restores the individual parts of the service robot to gestures before the dance or to specified gestures.

6. The method according to claim 1, wherein when the external speaker is playing the song and the time point for sending the part controlling commands in the selected dance controlling strategy arrives, sending the part controlling command to the part of the service robot including at least one of:

randomly selecting one part controlling command, or randomly selecting two or more part controlling commands of different parts in response to the time point for sending the part controlling commands in the selected dance controlling strategy; and, selecting one part controlling command, or selecting two or more part controlling commands of different parts, according to a sending order number of the part controlling command corresponding to an arrived time point for sending the part controlling commands.

7. The method according to claim 6, wherein selecting one part controlling command, or selecting two or more part controlling commands of different parts according to a sending order number of the part controlling command corresponding to the arrived time point for sending the part controlling commands includes:

dividing the dance controlling strategy into a plurality of sub-controlling strategies, wherein each of the sub-controlling strategies includes a pre-controlling strategy and a post-controlling strategy, and times for sending the part controlling commands in the pre-controlling strategy and times for sending the part controlling commands in the post-controlling strategy are same;

determining a sub-controlling strategy for the arrived time point for sending the part controlling commands according to the sending order number of the part controlling command corresponding to the arrived time point for sending the part controlling commands;

randomly selecting one part controlling command, or selecting two or more part controlling commands of different parts in response to the arrived time point for sending the part controlling commands belonging to the pre-controlling strategy of the sub-controlling strategy currently used; and selecting a part controlling command whose action effect corresponds to that of the part controlling command corresponding to the pre-controlling strategy when the arrived time point for sending the part controlling commands belongs to the post-controlling strategy of the sub-controlling strategy currently used.

8. The method according to claim 1, wherein providing the part controlling command corresponding to the preset action of the part of the service robot includes providing a fixed part controlling command indicating the turning of the part of the service robot at a fixed angle, and providing a random part controlling command indicating the turning of the part of the service robot at a random angle;

providing a dance mode corresponding to the song loaded from the song library, wherein the dance mode indicates a selection mode of the part controlling commands; and parsing the dance mode corresponding to the song loaded from the song library, and randomly selecting a fixed part controlling command, in response to the song loaded from the song library corresponding to a fixed dance mode;

randomly selecting one random part controlling command in response to the song loaded from the song library corresponding to a random dance mode;

selecting a fixed part controlling command or a random part controlling command, in response to the song loaded from the song library corresponds to a regular dance mode; and controlling the selected dance controlling strategy to select the part controlling command according to one of the fixed dance mode, the random dance mode, and the regular dance mode in response to the song loaded from the song library corresponds to a mixed dance mode.

9. An apparatus for controlling dancing of a service robot, comprising:

a storing unit configured for storing a part controlling command corresponding to a preset action of individual parts of the service robot, and storing a dance controlling strategy indicating a time for sending the part controlling commands and a time interval for sending the part controlling commands;

a connecting unit configured for establishing a wireless connection with an external speaker located outside the service robot in response to receiving a dance starting command;

a loading unit configured for loading a song from a song library of the service robot, and determining that the song loaded from the song library is a song to be played by the external speaker in response to receiving a dance starting command;

a selecting unit configured for selecting the dance controlling strategy used by the service robot, and determining a time point for sending the part controlling command in the dance controlling strategy in response to the song loaded from the song library; and a controlling unit configured for sending the part controlling command to a part of the service robot corresponding to the selected dance controlling strategy in response to the time point for sending the part controlling command, and controlling the service robot to dance to the song loaded from the song library in response to the external speaker playing the song loaded from the song library and the time point for sending the part controlling commands in the selected dance controlling strategy;

wherein the selecting unit includes a time point determining module for determining the time point for sending the part controlling command in response the dance controlling strategy and the time interval for sending the part controlling command.

10. The apparatus according to claim 9, wherein the selecting unit is configured for selecting the dance controlling strategy used by the service robot in response to at least one of a tempo of the song loaded from the song library; and, a stored relationship between a song and a dance controlling strategy wherein the stored relationship is stored in the storing unit.

11. The apparatus according to claim 10 wherein the time point determining module is further configured for determining a time interval for sending two successive part controlling commands according to a relation between the tempo of the song loaded from the song library and motor speeds of the individual parts of the service robot, and selecting a dance controlling strategy that satisfies the time interval for sending two successive part controlling commands;

determining that the time interval for sending two successive part controlling commands is greater than or equal to one beat in response to the tempo of the song loaded from the song library being greater than or equal to the motor speed of the service robot, determining that the time interval for sending two successive part controlling commands is less than one beat in response to the tempo of the song loaded from the song library being less than the motor speed of the service robot, or determining that the time interval for sending two successive part controlling commands is greater than or equal to one beat.

12. The apparatus according to claim 11 wherein the time point determining module is configured for:

determining that a minimum time interval for sending successive part controlling commands is one beat in response to the tempo of the song loaded from the song library being less than a first multiple of the motor speed and greater than a second multiple of the motor speed;

determining that a minimum time interval for sending two successive part controlling commands is two beats in response to the tempo of the song loaded from the song library is greater than the first multiple of the motor speed; and determining that a minimum time interval for sending two successive part controlling commands is half of one beat in response to the tempo of the song loaded from the song library is less than the second multiple of the motor speed;

wherein the first multiple of the motor speed is greater than the second multiple of the motor speed.

13. The apparatus according to claim 11, wherein the selecting unit further comprises a dance controlling strategy switching module configured for determining a time point for sending the part controlling command sent last time in the selected dance controlling strategy being a play end point of the song loaded from the song library in response to the time for sending the part controlling command indicated by the selected dance controlling strategy;

switching the selected dance controlling strategy, and re-determining times for sending the part controlling commands and a time interval for sending the part controlling commands of a dance controlling strategy after the switching by using the time point determining module in response to the time point for sending the part controlling command sent last time in the selected dance controlling strategy not being the play end point of the song loaded from the song library, wherein the time interval of the part controlling commands of the dance controlling strategy after the switching is different from that before the switching; and switching to a reset controlling strategy of the song loaded from the song library, and determining a reset controlling command indicated by the reset controlling strategy in response to the time point for sending the part controlling command sent last time in the selected dance controlling strategy being the play end point of the song loaded from the song library, wherein the reset controlling command restores the individual parts of the service robot to gestures before the dance or to specified gestures.

14. The apparatus according to claim 9, wherein the controlling unit comprises a part controlling command selecting module configured for at least one of randomly selecting one part controlling command, or randomly selecting two or more part controlling commands of different parts in response to the time point for sending the part controlling commands in the selected dance controlling strategy; and, selecting one part controlling command, or selecting two or more part controlling commands of different parts in response to a sending order number of the part controlling command corresponding to the arrived time point for sending the part controlling commands.

15. The apparatus according to claim 14, wherein the selected dance controlling strategy being divided into a plurality of sub-controlling strategies, wherein each of the sub-controlling strategies comprises a pre-controlling strategy and a post-controlling strategy, and times for sending the part controlling commands in the pre-controlling strategy and times for sending the part controlling commands in the post-controlling strategy are same; and the part controlling command selecting module configured for:

determining a sub-controlling strategy for the arrived time point for sending the part controlling commands in response to the sending order number of the part controlling command corresponding to the arrived time point for sending the part controlling commands;

randomly selecting one part controlling command, or selecting two or more part controlling commands of different parts in response to the arrived time point for sending the part controlling commands belonging to the pre-controlling strategy of the sub-controlling strategy currently used; and selecting a part controlling command whose action effect corresponds to that of the part controlling command corresponding to the pre-controlling strategy in response to the arrived time point for sending the part controlling commands belongs to the post-controlling strategy of the sub-controlling strategy currently used.

16. The apparatus according to claim 9, wherein the part controlling command includes a fixed part controlling command indicating the turning of the body part of the service robot at a fixed angle and a random part controlling command indicating the turning of the body part of the service robot at a random angle;

the controlling unit further including a dance mode parsing module for parsing the dance mode corresponding to the song loaded from the song library, wherein the dance mode indicates a selection mode of the part controlling commands and wherein the controlling unit is further configured for randomly selecting a fixed part controlling command, or randomly selecting two or more fixed part controlling commands of different parts in response to the song loaded from the song library corresponding to a fixed dance mode and the time point for sending the part controlling commands in the selected dance controlling strategy;

randomly selecting one random part controlling command, or randomly selecting two or more random part controlling commands of different parts in response to the song loaded from the song library corresponding to a random dance mode and the time point for sending the part controlling commands in the selected dance controlling strategy;

selecting one fixed part controlling command or random part controlling command, or selecting two or more fixed part controlling commands or random part controlling commands of different parts in response to the song loaded from the song library corresponding to a regular dance mode and the time point for sending the part controlling commands in the selected dance controlling strategy; and controlling the selected dance controlling strategy to select a part controlling command according to one of the fixed dance mode, the random dance mode, and the regular dance mode in response to the song loaded from the song library corresponding to a mixed dance mode.

* * * * *